United States Patent
Ganapathy

(10) Patent No.: US 12,200,367 B2
(45) Date of Patent: Jan. 14, 2025

(54) AMBIENT LIGHT SENSING

(71) Applicant: TEXAS INSTRUMENTS INCORPORATED, Dallas, TX (US)

(72) Inventor: Karthik Rajagopal Ganapathy, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 204 days.

(21) Appl. No.: 17/827,645

(22) Filed: May 27, 2022

(65) Prior Publication Data

US 2023/0099807 A1  Mar. 30, 2023

Related U.S. Application Data

(60) Provisional application No. 63/248,735, filed on Sep. 27, 2021.

(51) Int. Cl.
| | | |
|---|---|---|
| *H04N 23/71* | (2023.01) | |
| *G01J 1/42* | (2006.01) | |
| *H04N 23/55* | (2023.01) | |
| *H04N 23/56* | (2023.01) | |
| *H04N 23/72* | (2023.01) | |

(52) U.S. Cl.
CPC ............ *H04N 23/71* (2023.01); *G01J 1/4204* (2013.01); *H04N 23/55* (2023.01); *H04N 23/56* (2023.01); *H04N 23/72* (2023.01)

(58) Field of Classification Search
CPC ........ H04N 23/71; H04N 23/55; H04N 23/56; H04N 23/72; H04N 5/2354; H04N 5/2256; G01J 1/4204; H05B 47/125; G06K 9/2027; G06K 9/2036; F21V 33/0052; G03B 15/02–05
See application file for complete search history.

(56) References Cited

U.S. PATENT DOCUMENTS

| | | | |
|---|---|---|---|
| 6,989,859 B2 | 1/2006 | Parulski | |
| 8,860,819 B2 | 10/2014 | Okincha | |
| 10,593,294 B2 | 3/2020 | Bonnier et al. | |
| 2008/0303922 A1 | 12/2008 | Chaudhri et al. | |
| 2010/0072351 A1* | 3/2010 | Mahowald | G01J 1/1626 250/214 AL |
| 2011/0187859 A1 | 8/2011 | Edelson | |
| 2012/0320148 A1* | 12/2012 | Unger | H04N 23/698 348/36 |

(Continued)

*Primary Examiner* — Abdelaaziz Tissire
(74) *Attorney, Agent, or Firm* — John R. Pessetto; Frank D. Cimino

(57) ABSTRACT

A camera system includes a camera, an illumination source, a first light sensor having a first light sensor output, and a second light sensor having a second light sensor output. A processor has inputs coupled to the camera's output, the first light sensor output, and the second light sensor output, and the processor has an output coupled to the input of the illumination source. The processor receives a first light signal from the first light sensor output, receive a second light signal from the second light sensor output, determine a first weight for the first light signal and a second weight for the second light signal based on a difference between the first and second light signals, calculate a weighted average of the first and second light signals using the first and second weights, and determine whether to turn on the illumination source based on the weighted average.

7 Claims, 10 Drawing Sheets

(56) References Cited

U.S. PATENT DOCUMENTS

| | | | |
|---|---|---|---|
| 2017/0229059 A1* | 8/2017 | Bonnier | G06F 3/017 |
| 2019/0068857 A1* | 2/2019 | Gruhlke | H04N 23/58 |
| 2019/0094823 A1* | 3/2019 | Gao | G05B 15/02 |
| 2019/0164522 A1* | 5/2019 | Bonnier | G06F 3/038 |
| 2019/0253606 A1* | 8/2019 | Nagata | H04N 23/74 |
| 2019/0331330 A1* | 10/2019 | Chen | H04N 23/11 |

\* cited by examiner

AMBIENT LIGHT SENSING

CROSS-REFERENCE TO RELATED APPLICATIONS

This application claims priority to U.S. Provisional Application No. 63/248,735, filed Sep. 27, 2021, which is hereby incorporated by reference in its entirety.

BACKGROUND

Some camera systems are operable during the daytime and at night. For example, a camera may be integrated into a video doorbell housing for a door to a home. The doorbell camera provides live images to an Internet-connected device (e.g., a mobile phone, tablet device, etc.). The image sensor of the camera may be capable of detecting electromagnetic signals in the visible part of the spectrum (e.g., having wavelengths of approximately 400 nm to 700 nm) as well as in the near infra-red (NIR) part of the spectrum (e.g., having wavelengths of approximately 780 nm to 1000 nm). The utility of such cameras in low ambient (e.g., visible light) conditions is facilitated by activating MR light emitting diodes (LEDs). In some implementations, one camera is used for visible light (day time) and another camera is used for MR (low ambient light conditions).

SUMMARY

In one embodiment, a camera system includes a camera having a camera output, an illumination source having an input, a first light sensor having a first light sensor output, and a second light sensor having a second light sensor output. A processor has inputs coupled to the camera output, the first light sensor output, and the second light sensor output, and the processor has an output coupled to the input of the illumination source. The processor is configured to receive a first light signal from the first light sensor output, receive a second light signal from the second light sensor output, determine a first weight for the first light signal and a second weight for the second light signal based on a difference between the first and second light signals, calculate a weighted average of the first and second light signals using the first and second weights, and determine whether to turn on the illumination source based on the weighted average.

In another embodiment, an ambient light sensing system includes a light sensor having a light sensor output, a moveable optical element, and a motor mechanically coupled to the movable optical element. The motor has a motor control input. A processor is included and has an input coupled to the light sensor output and has a control output coupled to the motor control input. The processor is configured to provide a control signal to the motor to actuate the motor to move the movable optical element between a first position and a second position. In the first position light is received by the light sensor after passing through the moveable optical element and a first light sensor signal is received by the processor. In the second position, light is received by the light sensor without passing through the movable optical element and a second light sensor signal is received by the processor. The processor is configured to determine an ambient light level based on first light sensor signal and the second light sensor signal.

In yet another embodiment, an ambient light sensing system includes a light sensor having a light sensor output and a reflective optical element configurable to reflect light from an angle into the light sensor. The reflective optical element has a control input. A processor has an input coupled to the light sensor output and has a control output. The processor is configured to provide a control signal to the control input of the reflective optical element to change the angle of light reflected off of the reflective optical element to the light sensor from a first angle to a second angle. The processor is configured to receive a first light signal form the light sensor output corresponding to the first angle and a second light sensor signal from the light sensor output corresponding to the second angle. The processor is configured to determine an ambient light level based on first light sensor signal and the second light sensor signal.

In some example embodiments, the camera system may be utilized in a doorbell, a security camera, a drone, a cell phone, an industrial system or any other camera system that is capable of operating in low-light, bright-light and other conditions.

BRIEF DESCRIPTION OF THE DRAWINGS

For a detailed description of various examples, reference will now be made to the accompanying drawings in which.

The same reference numbers or other reference designators are used in the drawings to designate the same or similar (either by function and/or structure) features.

DETAILED DESCRIPTION

Figure 1:
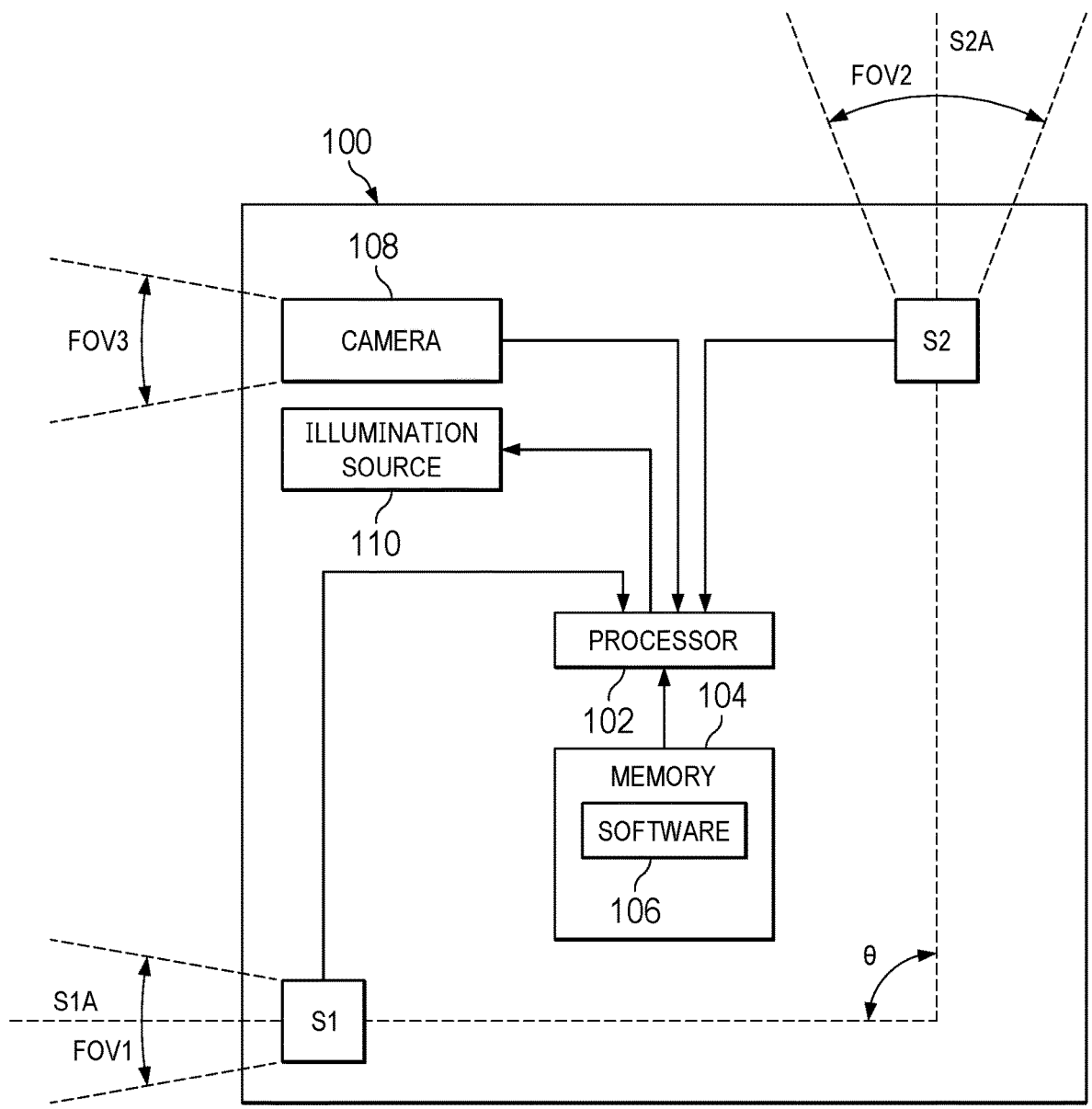
FIG. 1 is a block diagram of a camera system including multiple ambient light sensors, in accordance with an embodiment.

The NIR camera will produce an enhanced image if NIR lights, e.g., NIR light emitting diodes (NIR LEDs), are illuminated at night. An ambient light sensor may be provided by which the camera system can differentiate a high ambient light condition (e.g., daytime) from a low ambient light condition (e.g., nighttime). The ambient light sensor has a "field-of-view" (FOV) in which the sensor receives light from a particular direction and in accordance with a particular angular cone. In some example embodiments, the ambient light sensor produces a signal indicative of a low ambient light condition so as to cause the camera system to turn ON the NIR LEDs.

If an artificial light source (e.g., a lamp, a streetlight, etc.) happens to be in the FOV of the light sensor, the signal from the ambient light sensor will be larger than if the artificial light source was not present. In fact, the artificial light source may be bright enough to confuse the camera system into determining that the ambient light condition is consistent with daytime (sunny) conditions, but such an artificial light source may be insufficient to adequately illuminate the area around the camera. For example, visible light from the headlight of an automobile or a streetlamp may be bright enough to confuse the system into determining that it is daytime, but not bright enough to adequately illuminate the front porch where the video doorbell system containing the camera is located.

Multiple embodiments are described herein that may address this issue. In a first embodiment, the camera system includes a first ambient light sensor and a second ambient light sensor. The FOV of the ambient light sensors are different—one ambient light sensor receives light from one direction, and the other ambient light sensor receives light from a different direction. The light signals from the first and second ambient light sensors are averaged together to produce an average ambient light sensor signal. Because the ambient light sensors point in two different directions, even if an artificial light source is in the FOV of one the sensors, the artificial light source is not likely to be in the FOV of the other sensor. The average ambient light sensor signal provides a more accurate representation of the ambient light condition of the camera system.

A second embodiment includes an ambient light sensor, a moveable optical element, and a motor mechanically coupled to the movable optical element. The moveable optical element may diffract the light passing through it, so that the light that exits the moveable optical element is at an angle to the light that is received into the moveable optical element. The motor is controlled by a processor to move the moveable optical element in front of the light sensor and away from the light sensor. When, the moveable optical element is in front of the light sensor, light received by the ambient light sensor from the optical element is at an angle from the light received by the light sensor when the moveable optical element is moved out of the field-of-view of the ambient light sensor. Accordingly, the ambient light sensor is able to receive light from two different directions, and the camera system performs an averaging of the two light signals to provide a more accurate representation of the ambient lighting condition. In another example, rather than a motor to move the moveable optical element, a solenoid could be used to perform linear actuation of the optical element.

A third embodiment includes a reflective optical (e.g., digital micromirror device) whose reflective surface can be tilted between two different angles to cause light to be received into the ambient light sensor from two different angles. The camera system performs an averaging of the two light signals to provide a more accurate representation of the ambient lighting condition.

FIG. 1 is a block diagram of a camera system 100 in accordance with an embodiment. In one example embodiment, camera system 100, as well as the other camera systems described herein, is implemented as part of video doorbell system (e.g., FIG. 1 may illustrate a printed circuit board (PCB) or semiconductor device which forms part of the camera system—the PCB and/or semiconductor device may be packaged such that camera 108, illumination source 110 and sensors S1 and S2 are not blocked by the packaging but the other components are covered by the packaging). Camera system 100 includes a processor 102, a memory device 104, a camera 108, an illumination source 110, and ambient light sensors S1 and S2. The memory device 104 is a non-transitory, storage device such as volatile memory (e.g., random-access memory) or non-volatile storage (e.g., read-only memory). Memory device 104 includes software 106. Software 106 is executable by processor 102. Functionality described herein as attributed to the processor 102 is implemented by the processor 102 executing software 106. Processor 102 may include a microprocessor, microcomputer, digital circuitry, analog circuitry, registers and/or a combination thereof.

Ambient light sensor S1 is sensitive to light received in its field-of-view (FOV1), and ambient light sensor S2 is sensitive to light received in its field-of-view (FOV2). In one embodiment, the ambient light sensors S1 and S2 are identical and thus have the same FOV, but ambient light sensor S1 is mounted in the camera system 100 such that its FOV1 is pointed in a different direction than the FOV2 of ambient light sensor S2. An axis defining each FOV is shown for the sensors. Axis S1$a$ is generally the mid-point within the cone of FOV1, and axis S2$a$ is the mid-point within the cone of FOV2. FIG. 1 shows that the angle between axes S1$a$ and S2$a$ is $\theta$. In general, the angle $\theta$ is large enough that there is not much overlap in the FOVs of the two sensors. In one example, $\theta$ is in the range of 20 degrees to 180 degrees. In some example embodiments, camera system 100 may include more than two light sensors. One or more of the light sensors may be located on the face of the camera system (such as facing in the same direction as the camera), while others may be placed on the side, top or bottom of the camera system 100.

The camera 108 (which has its own field of view, FOV3) is any suitable type of image sensor to produce still images or video. This image/video data may be provided to the processor 102. The camera 108 includes both ambient visible light and ambient IR light image capabilities. The illumination source 110 includes one or more NIR lights such as NIR LEDs, or any other illumination source capable of providing adequate lighting conditions in low visible light ambient conditions. The processor 102 can control the illumination source 110 to be on or off. The processor 102 processes light signals (electrical signals that indicate the brightness level of the ambient light received by the sensors) to turn on the illumination source 110 during low ambient light conditions and to turn off the illumination source 110 during bright ambient light conditions.

Figure 2:
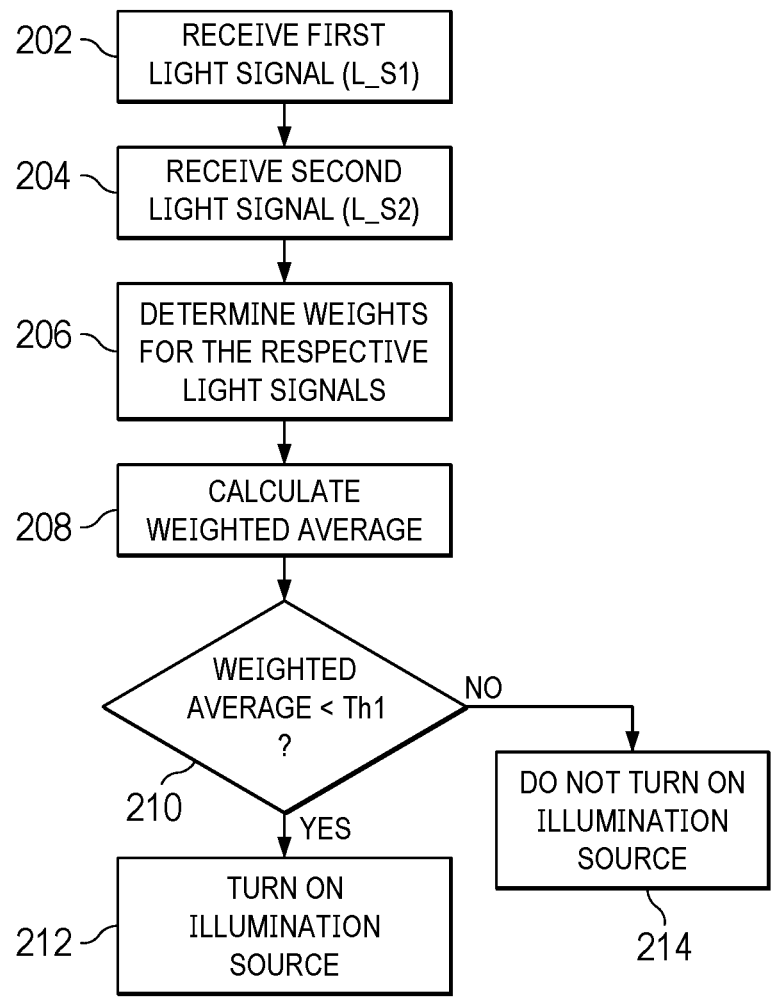
FIG. 2 is a flowchart illustrating a method of operation of the camera system of FIG. 1, in accordance with an embodiment.

FIG. 2 is a flow chart illustrating a method of operating the camera system 100 (FIG. 1). The steps of the illustrative method may be performed by the processor 102 upon its execution of software 106. At step 202, the method includes the processor receiving a first light signal from ambient light sensor S1. The first light signal is designated L_S1. At step 204, the processor also receives a second light signal (L_S2) from ambient light sensor S2. The order of steps 202 and 204 can be reversed from that shown in FIG. 2—the processor 102 receiving light signal L_S2 and then receiving light signal L_S1. Alternatively, the processor 102 may receive both light signals L_S1 and L_S2 concurrently, rather than sequentially.

If ambient lighting condition is consistent with nighttime (low visible light condition), both light signals L_S1 and L_S2 should be at magnitudes consistent with low lighting conditions (e.g., small amplitude signals). However, if an artificial light source is in the FOV of one of the light sensors, then the light signal from that sensor will be substantially larger than the light signal from the other light signal. For example, if a lamp or streetlight is in the FOV1 of ambient light sensor S1, but is not in the FOV2 of ambient light sensor S2, the light signal from sensor S1 will be larger than the light signal from sensor S2, L_S1 will be greater than L_S2.

Figure 3:
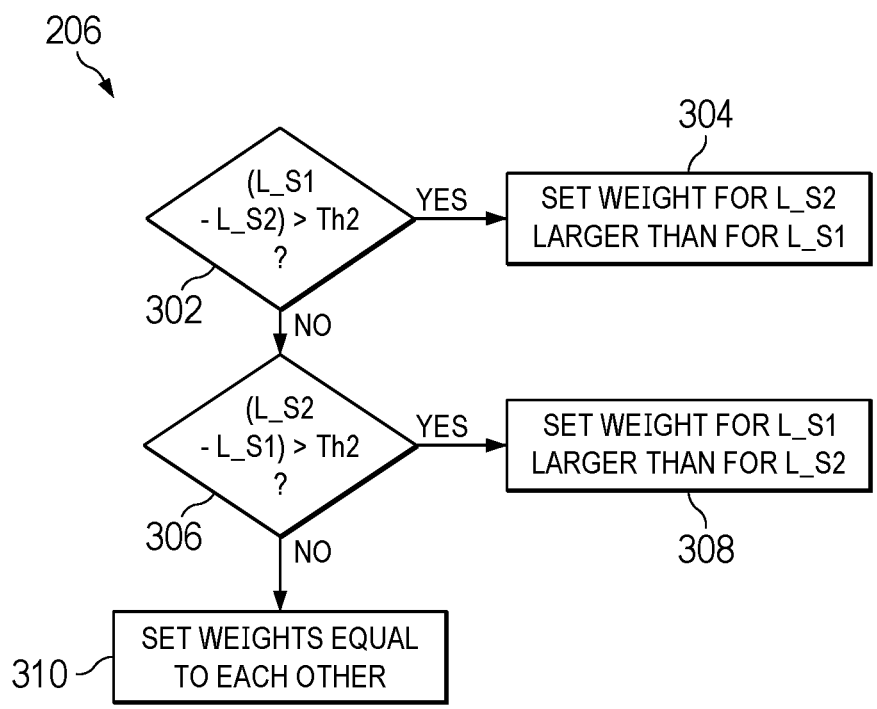
FIG. 3 is a flowchart illustrating the determination of weights for computing a weighted average of the signals from the multiple light sensors, in accordance with an embodiment.

In accordance with an embodiment, the processor 102 computes an average of light signals L_S1 and L_S2 to produce an average light signal that may more accurately reflect the actual ambient lighting conditions than just the light signal from one of the light sensors. The processor 102 may compute a weighted average of light signals L_S1 and L_S2. For example, at step 206, the processor 102 determines a weight for the light signal L_S1 and a separate weight for the light signal L_S2. In one example, the weight for the larger of the two light signals is set by the processor 102 to be smaller, and the weight for the smaller of the two light signals is set to be larger. FIG. 3 is a flowchart illustrating an example method for setting the weights, and will be described below.

At step 208, the processor 102 calculates the weighted average of the light signals L_S1 and L_S2 (using their assigned weighting factors). The weighted average is then compared at step 210 to a threshold, Th1. The threshold Th1 is a value (e.g., either set during fabrication of the camera system, set based on system specifications, set during system operation by an end-user and/or set during operation by the system) that differentiates daytime lighting conditions form nighttime lighting conditions. If the weighted average is less than the threshold Th1 (which would be consistent with nighttime lighting conditions), the processor 102 asserts a control signal to turn on illumination source 110. However, if the weighted average is greater than the threshold Th1 (which would be consistent with daytime lighting conditions), the processor 102 does not cause the illumination source 110 to turn on, or if the illumination source 110 is already on, the processor turns it off. In one embodiment, the weighted average being equal to Th1 may result in either the processor turning on the illumination source 110 or turning it off.

FIG. 3 is a flowchart illustrating an example implementation of step 206 (determination of the weights to be used in the weighted average) from FIG. 2. In this example, the weights are determined based on the relative magnitudes of light signals L_S1 and L_S2. At step 302, the processor computes [(L_S1)−(L_S2)] and compares that difference to a second threshold, Th2. If L_S1 is more than threshold Th2 larger than L_S2, then, at step 304, the processor sets the weight for light signal L_S2 to be larger than the weight for light signal L_S1. In one embodiment, for each light signal's weight, the processor 102 selects either a preset larger value or a preset smaller value. For example, the values for a given weight may be 0.25 or 0.75 (or any smaller or larger fractional or integer value). In step 304, the processor 102 may set the weight for light signal L_S2 to be 0.75 and the weight for light signal L_S1 to be 0.25.

If (L_S1−L_S2) is not larger than the threshold Th2, then the processor 102 computes the computes (L_S2−L_S1) and compares that difference to the same threshold, Th2. If L_S2 is more than threshold Th2 larger than L_S1, then, at step 308, the processor sets the weight for light signal L_S1 to be larger than the weight for light signal L_S2. For example, the processor 102 may set the weight for light signal L_S1 to be 0.75 and the weight for light signal L_S2 to be 0.25.

If neither difference (L_S1−L_S2) nor (L_S2−L_S1) is larger than threshold Th2, then the magnitude of the light signals are close enough that the weights are set (in step 310) equal to each other by processor 102 (e.g., both weights are 1, 0.5, etc.).

Figure 4:
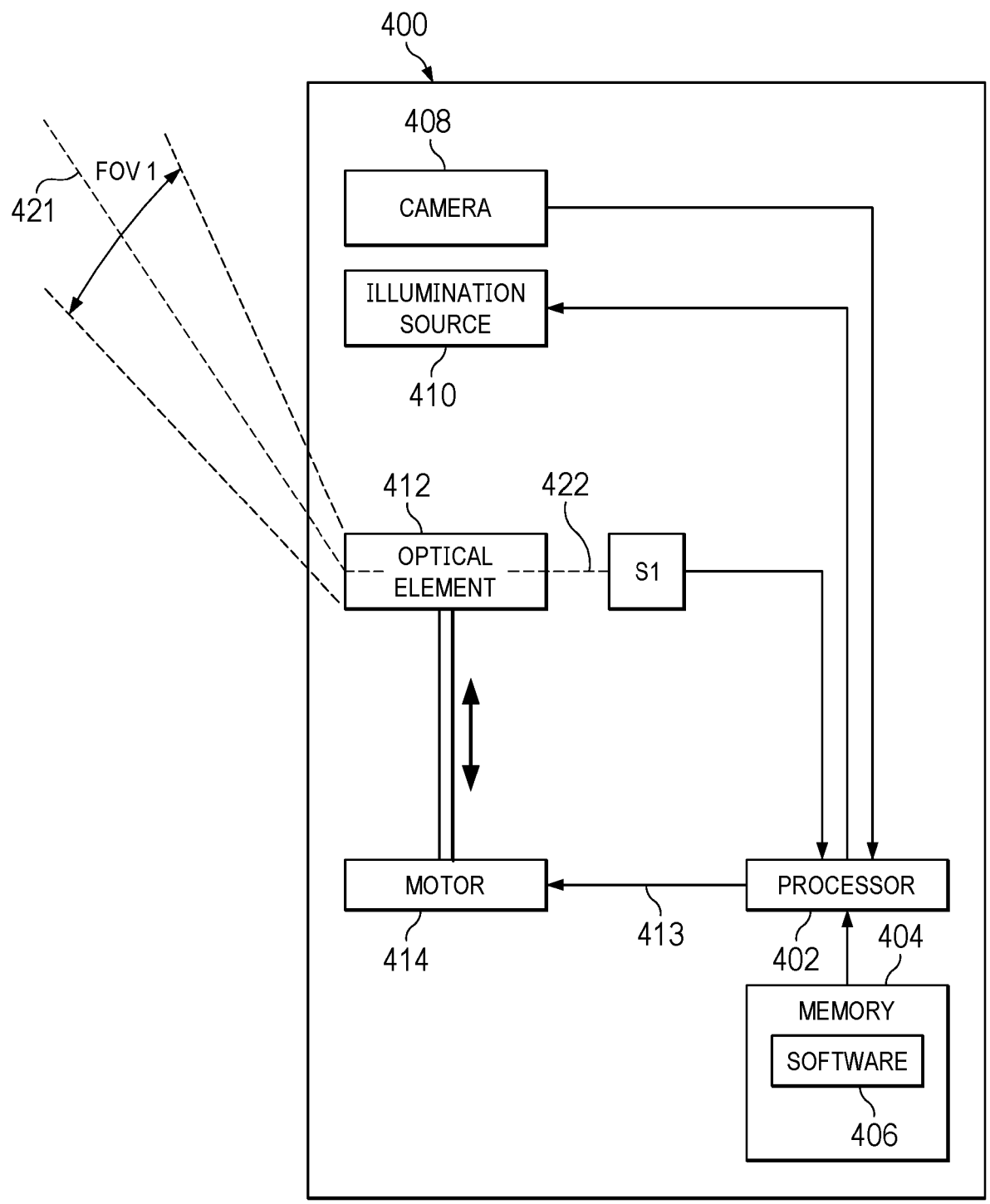
FIGS. 4 and 5 are block diagrams of another embodiment of a camera system in which a motor can move a moveable optical element, in accordance with an example.

FIG. 4 is a block diagram of a camera system 400 in accordance with another embodiment. Camera system 400 includes a processor 402, a memory device 404, a camera 408, an illumination source 410, a moveable optical element 412, a motor 414, and an ambient light sensor S1. Features in FIG. 4 that are identified with a reference number that has the same last two digits as a feature in FIG. 1 (e.g., processor 102 and processor 402) may be implemented in the same (or similar) manner and/or may have the same (or similar) functionality. Whereas as the camera system 100 of FIG. 1 had multiple ambient light sensors S1 and S2, the camera system 400 of FIG. 4 may have only a single ambient light sensor S1. The memory device 404 is a non-transitory, storage device such as volatile memory (e.g., random-access memory) or non-volatile storage (e.g., read-only memory). Memory device 404 includes software 406. Software 406 is executable by processor 402. Functionality described herein as attributed to the processor 402 is implemented by the processor 402 executing software 406. The ambient light sensor S1, camera 408 and illumination source 410 may be implemented as described above for camera 108 and illumination source 110. Processor 402 may include a microprocessor, microcomputer, digital circuitry, analog circuitry, registers and/or a combination thereof.

The moveable optical element 412 may be a film having a prismatic surface, which refracts light as light passes through the film. Accordingly, light entering the film at an incident angle exits the film at a different angle. An example of such a film is the Direction Turning Film by Luminit. Another example of the optical element 412 is a prism, which also refracts light. FIG. 4 illustrates the field-of-view of optical element 412 with a mid-point axis 421. Due to the refractive property of the optical element 412, the light exits the optical element along axis 422 into ambient light sensor S1.

Figure 5:
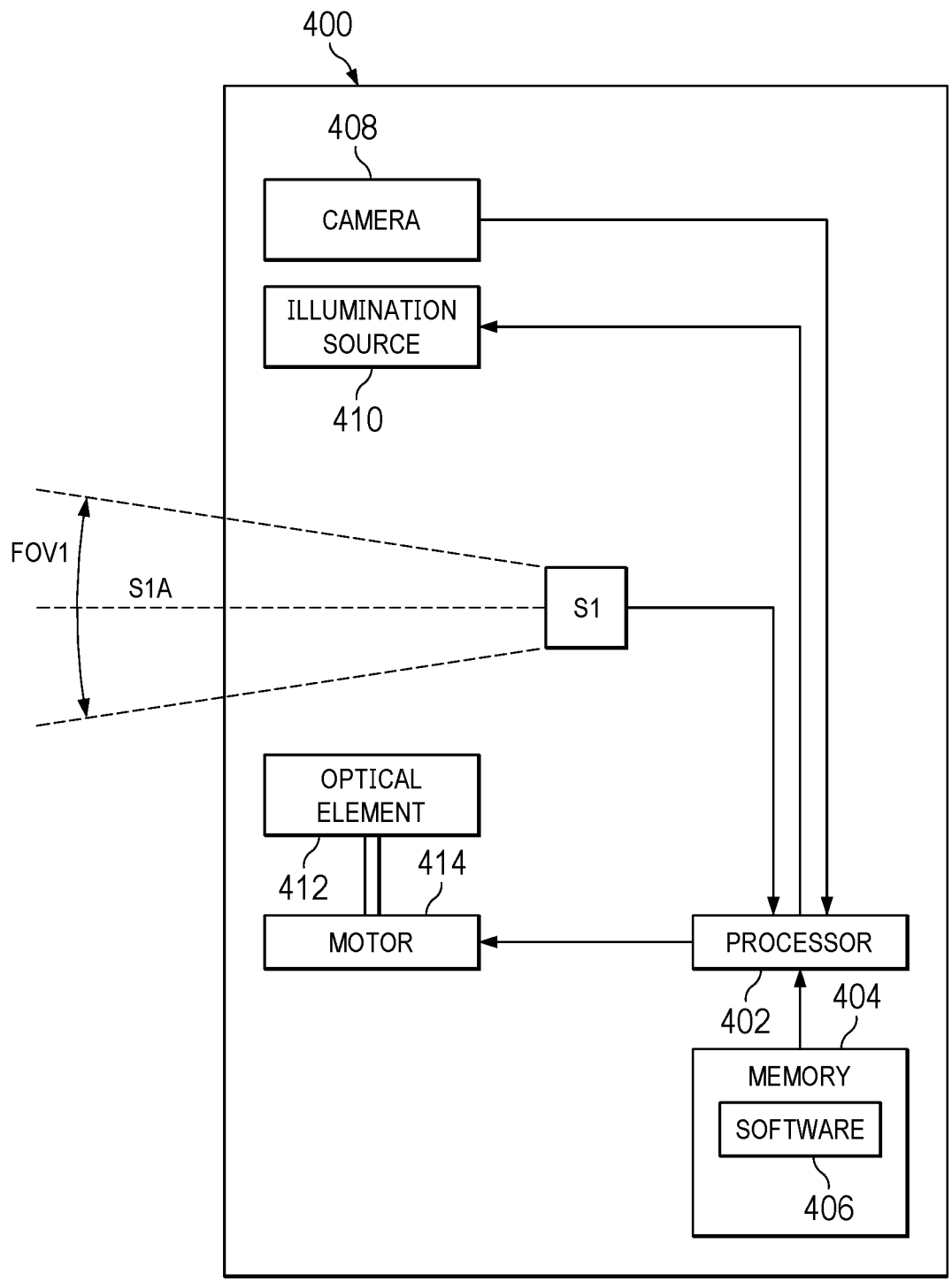

The moveable optical element 412 is mechanically coupled to motor 414. The processor 402 generates a control signal 413 and provides the control signal 413 to the motor 414 to operate the motor 414 to move the moveable optical element 412 between a first position and a second position. The first position is as shown in FIG. 4 in which light is received by the ambient light sensor S1 after the light has been refracted by the optical element. The second position is as shown in FIG. 5 in which the motor 414 has moved the moveable optical element 412 out of the way of the ambient light sensor S1 so that light received by the ambient light sensor does not first pass through the moveable optical element. Without the refractive functionality of the moveable optical element, the mid-point axis S1a of the FOV1 of the ambient light sensor S1 is at a different angle that axis 421 of FIG. 4. Accordingly, one ambient light sensor can be used to sequentially receive light from two different angles. The motor 414 may be a stepper motor or other suitable type of mechanism that can be controlled by processor 402 to permit the ambient light sensor S1 to provide two time-sequenced light signals to the processor that are generated based on light at two different angles.

Figure 6:
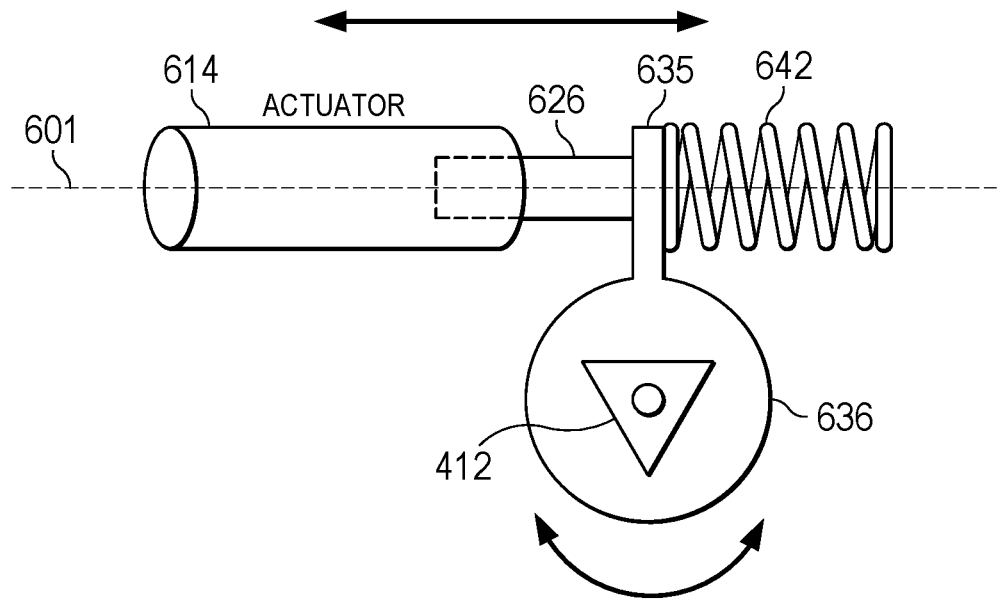
FIG. 6 is a depiction of an actuator mechanically coupled to an optical element, in accordance an embodiment.
Figure 7:
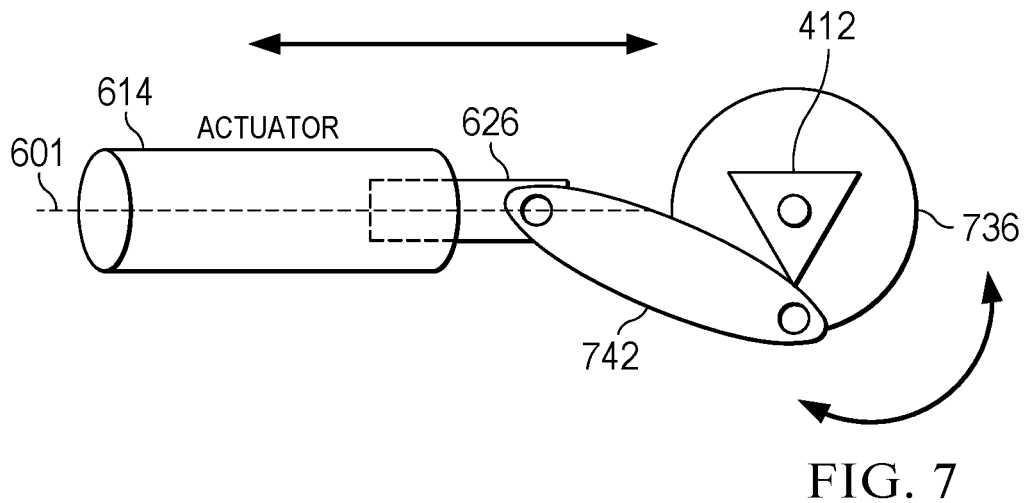
FIG. 7 is another depiction of an actuator mechanically coupled to an optical element, in accordance an embodiment.

A linear actuator may be used in place of a motor to linearly move the moveable optical element. FIGS. 6 and 7 illustrates example implementations of how a linear actuator can be coupled to the moveable optical element. In FIG. 6, a linear actuator has an extension rod 626 within a tube 614 along axis 601. When the linear actuator forces the extension rod 626 to the right, the extension rod pushes against a tab 635 coupled to (or part of) a turntable 636. The moveable optical element 412 is mounted on the turntable 636 and rotates as the linear actuator forces the extension rod 626 to the right. A compression spring 642 provides right to left force against the tab when the linear actuator retracts the extension rod back to the left. The moveable optical element 412 may be a prism and rotation in one direction or another may cause light from different angles to pass through the prism to the sensor. In another embodiment, the spring 636 may be an extension spring.

FIG. 7 shows an embodiment in which the extension rod is pivotally coupled to one end of a bracket 742, with the other end of the bracket pivotally coupled to a turntable 736 containing the moveable optical element 412. Rightward translation of the extension rod 626 by the linear actuator causes the turntable 736 (and thus the moveable optical element) to turn counterclockwise. Leftward translation of the extension rod 626 causes the turntable 736 (and thus the moveable optical element) to turn clockwise.

Figure 8:
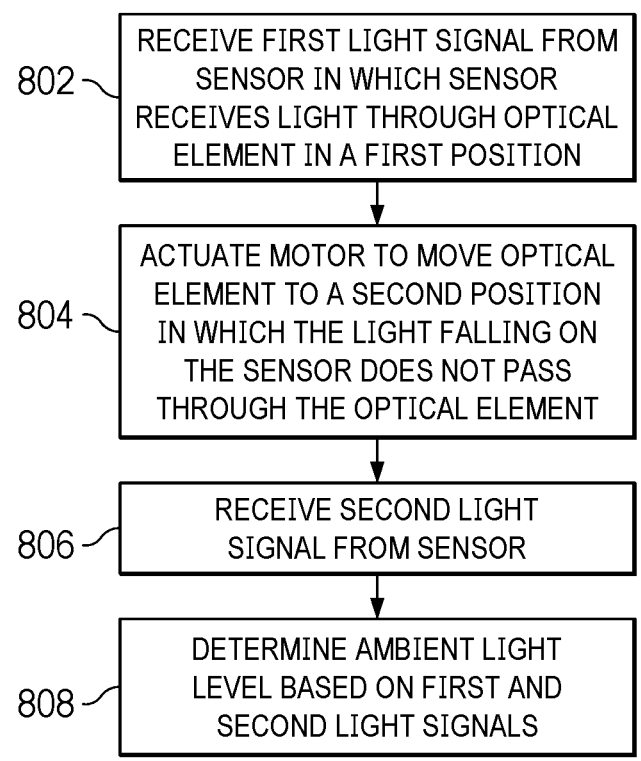
FIG. 8 is a flowchart illustrating a method of operation of the camera system of FIG. 4, in accordance with an embodiment.

FIG. 8 is a flowchart chart illustrating a method for operating camera system 400 of FIG. 4. The steps 802-808 shown in FIG. 8 may be performed by the processor 402 upon its execution of software 406. At step 802, the processor receives a first light signal from the ambient light sensor S1 in which the sensor receives light through the moveable optical element 412 located in a first position. For example, the first position of step 802 may be the position shown in FIG. 4 in which light refracts through the moveable optical element 412 into the light sensor S1.

At 804, the method includes the processor 402 actuating the motor 414 through control signal 413 to cause the motor to move the moveable optical element 412 to a second position in which light through received by the ambient light sensor S1 does not pass through optical element 412. At step 806, the processor 402 receives a second light signal from the ambient light sensor S1 without light having passed through the moveable optical element 412. In an alternative embodiment, in the first position the moveable optical element 412 may not be in front of the ambient light sensor (light received by the sensor is not refracted by the optical element), and in the second position, the moveable optical element 412 is in front of the ambient light sensor (light received by the sensor is refracted by the optical element).

At step 808, the processor 402 determines the ambient light level based on the first and second light signals received at steps 802 and 806. In step 808, the processor 402 may average the two light signals together, and the average may be a weighted average as described above.

Figure 9:
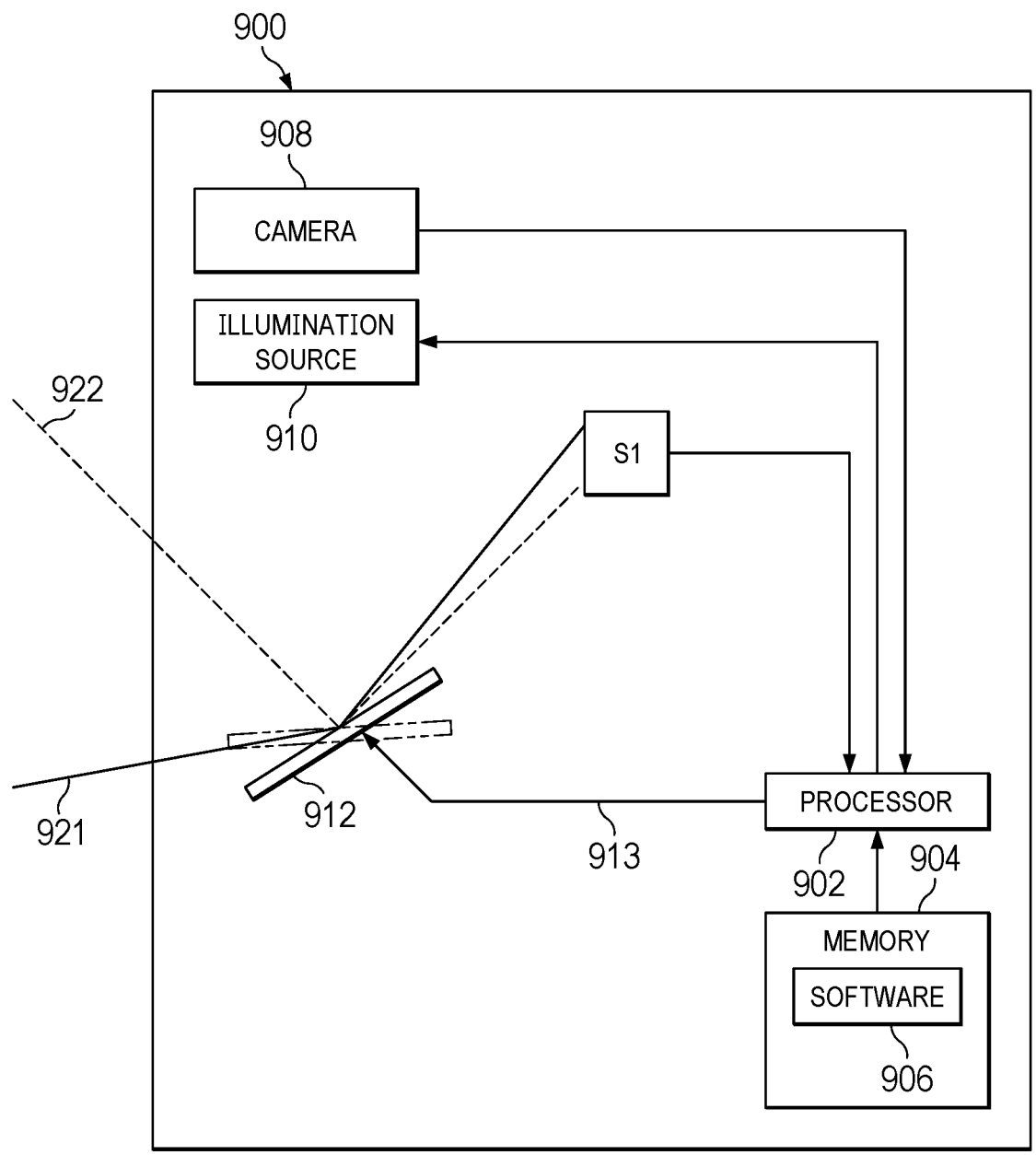
FIG. 9 is a block diagram of another embodiment of a camera system including a reflective optical element, in accordance with an example.

FIG. 9 is a block diagram of a camera system 900 in accordance with another embodiment. Camera system 900 includes a processor 902, a memory device 904, a camera 908, an illumination source 910, a reflective optical element 912, and an ambient light sensor S1. Features in FIG. 9 that are identified with a reference number that has the same last two digits as a feature in FIG. 1 and/or a feature in FIG. 4 (e.g., processor 102, processor 402 and processor 902) may be implemented in the same (or similar) manner and/or may have the same (or similar) functionality. The camera system 900 of FIG. 9 may have only a single ambient light sensor S1. The memory device 904 is a non-transitory, storage device such as volatile memory (e.g., random-access memory) or non-volatile storage (e.g., read-only memory). Memory device 904 includes software 906. Software 906 is executable by processor 902. Functionality described herein as attributed to the processor 902 is implemented by the processor 902 executing software 906. The ambient light sensor S1, camera 908 and illumination source 910 may be implemented as described above for camera 908 and illumination source 910. Processor 902 may include a microprocessor, microcomputer, digital circuitry, analog circuitry, registers and/or a combination thereof.

In one embodiment, the reflective optical element 912 includes a digital micromirror device (DMD). A DMD has an optically reflective surface that can be tilted between different angles based on the polarity of a voltage applied to contacts of the DMD. FIG. 9 illustrates the reflective surface of the reflective optical element 912 tilted at two different angles (while an actual DMD semiconductor die does not tilt, the individual mirrors formed over the semiconductor die may tilt in one or more directions). With the surface at one position, light along incident axis 921 reflects off of the surface into the ambient light sensor S1. At the other tilt position shown in FIG. 9, light along incident axis 922 reflects off of the surface into the ambient light sensor. Accordingly, light from two different angles can be received by the ambient light sensor. The processor 902 asserts a control signal 913 to the reflective optical element 912 to change the tilt angle of its reflective surface.

Figure 10:
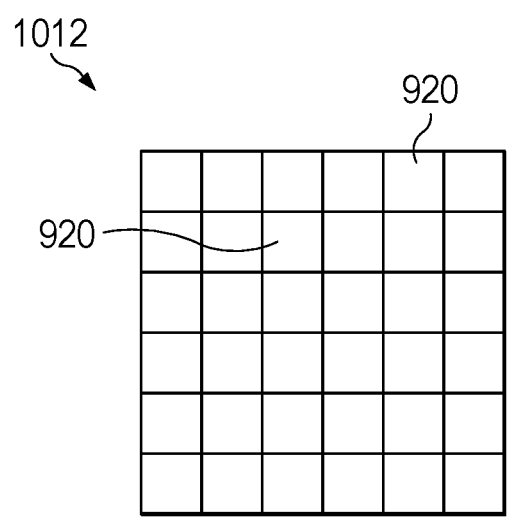
FIG. 10 is an array of reflective mirrors of a digital micromirror device, in accordance with an example.

FIG. 10 shows a top-down view of a DMD 1012, which can be used to implement reflective optical element 912. The DMD 1012 includes an array of individual mirrors 920, each of which can be individually controlled by processor 902 to be tilted between two different angles.

Figure 11:
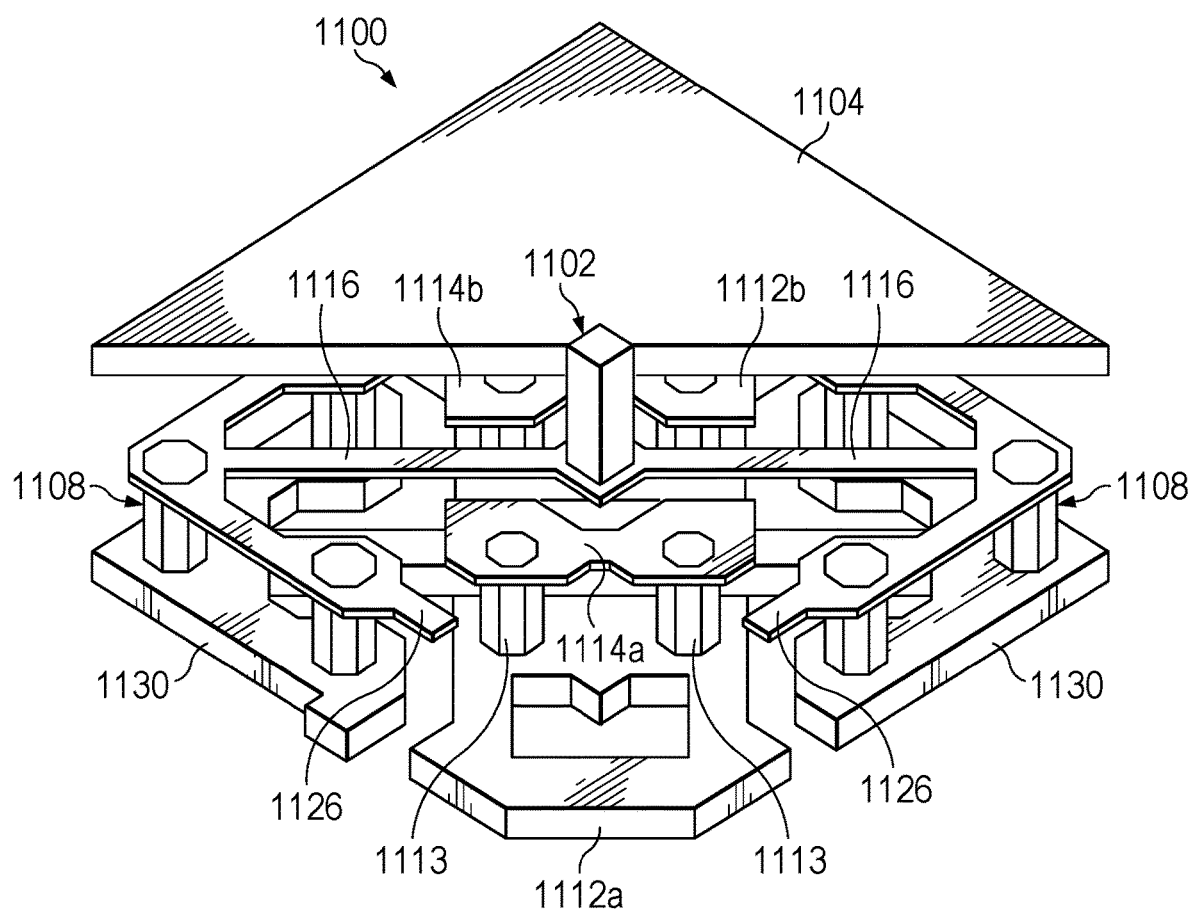
FIG. 11 is a perspective view of a single reflective mirror of a digital micromirror device, in accordance with an example.

FIG. 11 illustrates a single DMD pixel element 1100 (e.g., individual mirror 920). An array of such pixel elements may be formed on a common semiconductor die. The DMD pixel element 1100 of the example of FIG. 11 includes a hinge 1116, an address portion, and a micromirror 1114. The hinge 1116 may be a torsion hinge and may be supported on each side by hinge posts. Six bias vias 1108 support spring tips 1126 (two of which are shown in FIG. 11 and two more are present but hidden in this view) and hinge 1116 above the lower layer (also referenced as a "substrate") 1130. The bias vias 1108 may also operate to relay a bias voltage to hinge 1116. The micromirror 1104 may include a reflective metal surface. The micromirror 1104 is supported above the hinge 1116 by a mirror via 1102. In addition to providing support for the micromirror 1104, the mirror via 1102 may conductively transfer the bias voltage to the micromirror 1104. The bias voltage may be conductively transferred to the spring tips 1126 and hinge 1116 through the six bias vias 1108. The bias voltage may be further transferred from the hinge 1116 to the micromirror 1104 through the mirror via 1102.

The address portion of the DMD pixel element 1100 includes two address pads 1112a, 1112b that each connect to raised address electrodes 1114a, 1114b, respectively. As illustrated in FIG. 11, address vias 1113 support the raised address electrodes 1114a, 114b above each address pad 1112a, 112b. In addition to supporting the raised address electrodes 1114a, 1114b, the address vias 1113 relay a control or address voltage from the address pads 1112a, 1112b to the raised address electrodes 1114a, 114b. The address pads 1112a, 1112b may be in communication with control circuitry, such as a static random access memory (SRAM) cell or the like, which selectively applies a control or address voltage to one of the two address pads 1112a, 112b to create an electrostatic force between the micromirror 1104 and the raised address electrodes 1114a, 1114b. A similar electrostatic force may be created between the micromirror 1104 and the address pads 1112a, 1112b.

The range of motion of the micromirror 1104 may be limited by spring tips 1126. During operation of DMD pixel element 1100, spring tips 1126 provide a landing point for micromirror 1104. For example, when micromirror 1104 is tilted in the direction of the raised address electrode 1114*a* and address pad 1112*a*, the spring tips 1126 positioned proximate these address elements operate as a landing point for micromirror 1104. Conversely, when micromirror 204 is tilted in the direction of the raised address electrode 1114*b* and address pad 1112*b*, the spring tips 1126 on the opposite side (and hidden in the view of FIG. 11) positioned proximate these address elements operate as a landing point for micromirror 1104. Thus, micromirror 1104 may be tilted in the positive or negative direction until the micromirror 1104 contacts one or more spring tips 1126. As described hereinabove, the base of the various vias 1102, 1108, and 1113 may be referred to as substrate.

In this description, the term "couple" may cover connections, communications, or signal paths that enable a functional relationship consistent with this description. For example, if device A generates a signal to control device B to perform an action: (a) in a first example, device A is coupled to device B by direct connection; or (b) in a second example, device A is coupled to device B through intervening component C if intervening component C does not alter the functional relationship between device A and device B, such that device B is controlled by device A via the control signal generated by device A.

A device that is "configured to" perform a task or function may be configured (e.g., programmed and/or hardwired) at a time of manufacturing by a manufacturer to perform the function and/or may be configurable (or reconfigurable) by a user after manufacturing to perform the function and/or other additional or alternative functions. The configuring may be through firmware and/or software programming of the device, through a construction and/or layout of hardware components and interconnections of the device, or a combination thereof.

As used herein, the terms "terminal", "node", "interconnection", "pin" and "lead" are used interchangeably. Unless specifically stated to the contrary, these terms are generally used to mean an interconnection between or a terminus of a device element, a circuit element, an integrated circuit, a device or other electronics or semiconductor component. As used herein, the term "light" includes any spectrum of electromagnetic energy including "visible light", infrared energy, ultraviolet and/or other portions of the electromagnetic emissions spectrum.

A circuit or device that is described herein as including certain components may instead be adapted to be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, for example, by an end-user and/or a third-party.

While certain elements of the described examples are included in an integrated circuit and other elements are external to the integrated circuit, in other example embodiments, additional or fewer features may be incorporated into the integrated circuit. In addition, some or all of the features illustrated as being external to the integrated circuit may be included in the integrated circuit and/or some features illustrated as being internal to the integrated circuit may be incorporated outside of the integrated. As used herein, the term "integrated circuit" means one or more circuits that are: (i) incorporated in/over a semiconductor substrate; (ii) incorporated in a single semiconductor package; (iii) incorporated into the same module; and/or (iv) incorporated in/on the same printed circuit board. Unless otherwise stated, "about," "approximately," or "substantially" preceding a value means+/−10 percent of the stated value, or, if the value is zero, a reasonable range of values around zero.

Modifications are possible in the described embodiments, and other embodiments are possible, within the scope of the claims.

What is claimed is:

1. A camera system, comprising:
    a camera having a camera output;
    an illumination source having an input;
    a first light sensor having a first light sensor output;
    a second light sensor having a second light sensor output; and
    a processor having inputs coupled to the camera output, the first light sensor output, and the second light sensor output, the processor having an output coupled to the input of the illumination source and the processor configured to:
        receive a first light signal from the first light sensor output;
        receive a second light signal from the second light sensor output;
        determine a first weight for the first light signal and a second weight for the second light signal, the first weight is greater than the second weight in response to the second light signal being greater than the first light signal;
        calculate a weighted average of the first and second light signals using the first and second weights; and
        determine whether to turn on the illumination source based on the weighted average.

2. The camera system of claim 1, wherein the camera is a near infra-red camera, and the illumination source is a near infra-red light.

3. The camera system of claim 1, wherein the first light sensor has a field of reception along a first axis, and the second light sensor has a field of reception along a second axis, and wherein an angle between the first and second axes is in a range from approximately 20 degrees to approximately 180 degrees.

4. The camera system of claim 1, wherein the processor is configured to determine the first weight to be greater than the second weight in response to the second light signal being more than a predetermined threshold greater than the first light signal.

5. The camera system of claim 1, further including memory and wherein the first and second weights are stored in the memory.

6. A camera system comprising:
    a camera;
    a light sensor;
    an illumination source; and
    a processor coupled to the camera, the light sensor and the illumination source, the processor operable to:
        receive a first light signal based on a first field of view, the first light signal having a first magnitude;
        receive a second light signal based on a second field of view which is different than the first field of view, the second light signal having a second magnitude;

determine a first weighting factor for the first light signal and a second weighting factor for the second light signal, the first weighting factor is greater than the second weighting in response to the second magnitude being greater than the first magnitude;

determine a weighted average of the first magnitude and the second magnitude based on the first weighting factor and the second weighting factor; and cause the illumination source to turn on or off responsive to the weighted average.

7. A camera system, comprising:

a camera having a camera output;

an illumination source having an input;

a first light sensor having a first light sensor output;

a second light sensor having a second light sensor output; and a processor having inputs coupled to the camera output, the first light sensor output, and the second light sensor output, the processor having an output coupled to the input of the illumination source and the processor configured to:

receive a first light signal from the first light sensor output;

receive a second light signal from the second light sensor output;

determine a first weight for the first light signal and a second weight for the second light signal, the first weight is equal to the second weight in response to the second light signal being within a threshold value of the first light signal;

calculate a weighted average of the first and second light signals using the first and second weights; and determine whether to turn on the illumination source based on the weighted average.

* * * * *